(12) United States Patent
Nehse et al.

(10) Patent No.: US 11,748,016 B2
(45) Date of Patent: Sep. 5, 2023

(54) METHOD FOR ADDING DISKS IN A RAID SYSTEM HAVING A PROTECTION POOL OF STORAGE UNITS

(71) Applicant: EMC IP Holding Company LLC, Hopkinton, MA (US)

(72) Inventors: Paul Nehse, Livermore, CA (US); Michael B. Thiels, San Martin, CA (US); Devendra V. Kulkarni, Santa Clara, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 26 days.

(21) Appl. No.: 17/313,999

(22) Filed: May 6, 2021

(65) Prior Publication Data
US 2022/0357867 A1   Nov. 10, 2022

(51) Int. Cl.
*G06F 3/06* (2006.01)

(52) U.S. Cl.
CPC .......... *G06F 3/0644* (2013.01); *G06F 3/0604* (2013.01); *G06F 3/0631* (2013.01); *G06F 3/0647* (2013.01); *G06F 3/0689* (2013.01)

(58) Field of Classification Search
CPC .... G06F 3/0644; G06F 3/0604; G06F 3/0631; G06F 3/0647; G06F 3/0689
See application file for complete search history.

(56) References Cited

U.S. PATENT DOCUMENTS

| | | | | |
|---|---|---|---|---|
| 6,378,039 B1 * | 4/2002 | Obara | .................. | G06F 3/0601 711/114 |
| 8,095,753 B1 * | 1/2012 | Pandey | ................. | G06F 3/0689 711/112 |
| 8,392,915 B2 * | 3/2013 | Friedman | .............. | G06F 9/4856 718/1 |
| 10,210,045 B1 | 2/2019 | Gao | | |
| 10,521,304 B1 | 12/2019 | Reddy et al. | | |
| 10,852,966 B1 * | 12/2020 | Liu | ....................... | G06F 3/0689 |
| 11,449,226 B2 * | 9/2022 | Hua | ..................... | G06F 11/1076 |
| 2003/0023811 A1 * | 1/2003 | Kim | ...................... | G06F 3/0601 711/114 |
| 2003/0191890 A1 * | 10/2003 | Okamoto | .............. | G06F 3/0617 711/112 |
| 2005/0063217 A1 * | 3/2005 | Shiraishi | ............. | G06F 11/1096 714/E11.034 |
| 2005/0114728 A1 | 5/2005 | Aizawa et al. | | |
| 2006/0212747 A1 * | 9/2006 | Okamoto | ............ | G06F 11/1092 714/E11.034 |
| 2008/0126734 A1 | 5/2008 | Murase | | |

(Continued)

FOREIGN PATENT DOCUMENTS

WO    2016122510 A1    8/2016

*Primary Examiner* — Ryan Bertram
(74) *Attorney, Agent, or Firm* — WOMBLE BOND DICKINSON (US) LLP

(57) ABSTRACT

A method of adding a disk in a redundant array of independent disks (RAID) system with a protection pool of storage units includes receiving a request to add a new physical disk to a storage cluster and partitioning the new physical disk into a set of physical extents. The method further includes allocating one or more physical extents of the set of physical extents of the new physical disk to at least one array of physical extents, wherein the array of physical extents is distributed across physical disks of the storage cluster.

11 Claims, 15 Drawing Sheets

(56) References Cited

U.S. PATENT DOCUMENTS

| | | | |
|---|---|---|---|
| 2010/0199041 A1 | 8/2010 | Schnapp et al. | |
| 2013/0067191 A1* | 3/2013 | Mehra | G06F 3/0689 |
| | | | 711/E12.002 |
| 2013/0290626 A1* | 10/2013 | Sundrani | G06F 11/1096 |
| | | | 711/E12.001 |
| 2014/0032837 A1 | 1/2014 | Nagasaki et al. | |
| 2014/0208155 A1 | 7/2014 | Pan | |
| 2014/0215262 A1* | 7/2014 | Li | G06F 11/1092 |
| | | | 714/6.21 |
| 2015/0378858 A1 | 12/2015 | Ishizaka et al. | |
| 2016/0170851 A1 | 6/2016 | Goldberg et al. | |
| 2017/0024295 A1 | 1/2017 | Klughart | |
| 2017/0192895 A1* | 7/2017 | Li | G06F 3/0631 |
| 2019/0129795 A1 | 5/2019 | Xu et al. | |
| 2020/0218617 A1 | 7/2020 | Knestele et al. | |
| 2020/0310644 A1* | 10/2020 | Hua | G06F 3/0644 |
| 2020/0341845 A1 | 10/2020 | Gao et al. | |
| 2021/0389897 A1 | 12/2021 | Choi et al. | |
| 2022/0113875 A1* | 4/2022 | Hua | G06F 3/0605 |

* cited by examiner

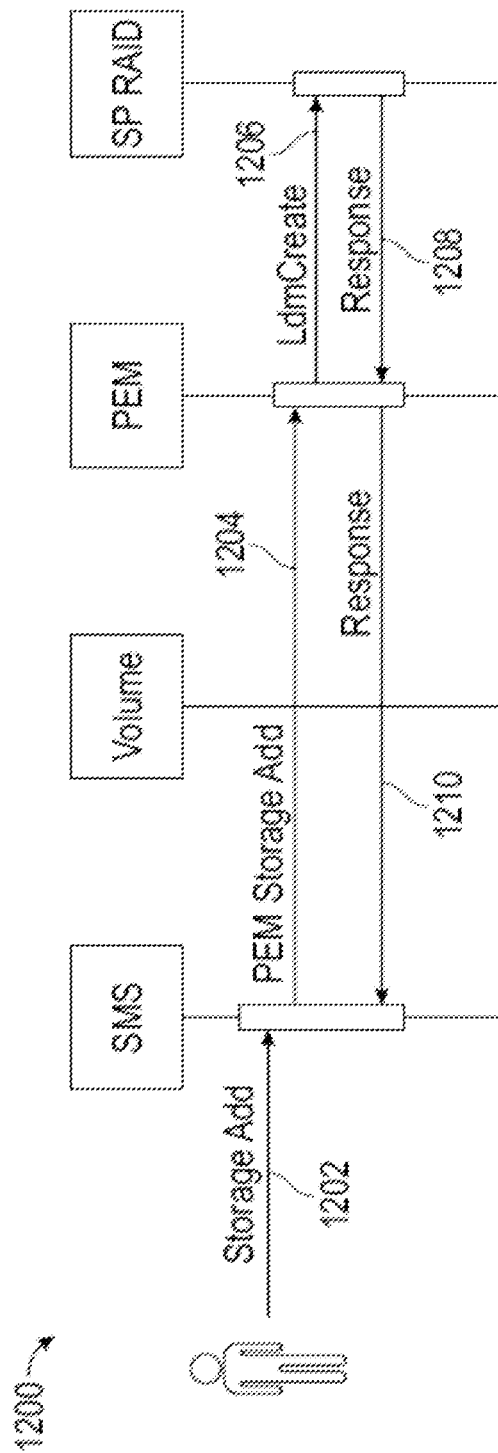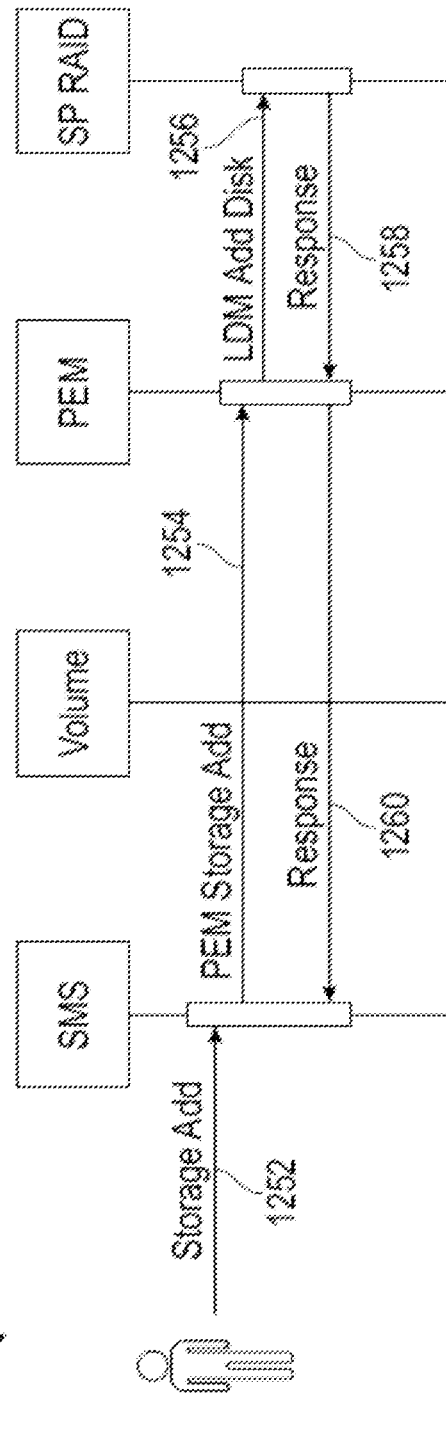
FIG. 12A
FIG. 12B

US 11,748,016 B2

METHOD FOR ADDING DISKS IN A RAID SYSTEM HAVING A PROTECTION POOL OF STORAGE UNITS

CROSS-REFERENCE TO RELATED APPLICATIONS

This application is related to U.S. application Ser. No. 17/313,959, filed on May 6, 2021; U.S. application Ser. No. 17/313,960, filed on May 6, 2021; and U.S. application Ser. No. 17/313,996, filed on May 6, 2021, each of which is hereby incorporated by reference in its entirety.

FIELD OF THE INVENTION

Embodiments of the present invention relate generally to storage applications. More particularly, embodiments of the invention relate to method for data reconstruction and adding disks in a Redundant Array of Independent Disks (RAID) system having a protection pool of storage units.

BACKGROUND

Customers are increasingly adopting different technologies for data storage. Both appliances and software only packages that can be deployed in a hypervisor environment are desired. The scale up architecture needs to be extensible to be deployed in both physical and virtual environments.

Currently, Data Domain (DD) uses a scale up architecture which may require very large and complex disk farms to meet customer capacity and performance requirements. Protection pool architecture, for example, allows linear scaling of performance and capacity by adding storage nodes. From its inception, DD has been focused on single node appliances.

BRIEF DESCRIPTION OF THE DRAWINGS

Embodiments of the invention are illustrated by way of example and not limitation in the figures of the accompanying drawings in which like references indicate similar elements.

FIG. 12A is a flow diagram of an example method of adding disks in a RAID data storage system with a protection pool of storage units, according to some embodiments FIG. 12B is a flow diagram of another example method of adding disks in a RAID data storage system with a protection pool of storage units, according to some embodiments

DETAILED DESCRIPTION

Figure 1:
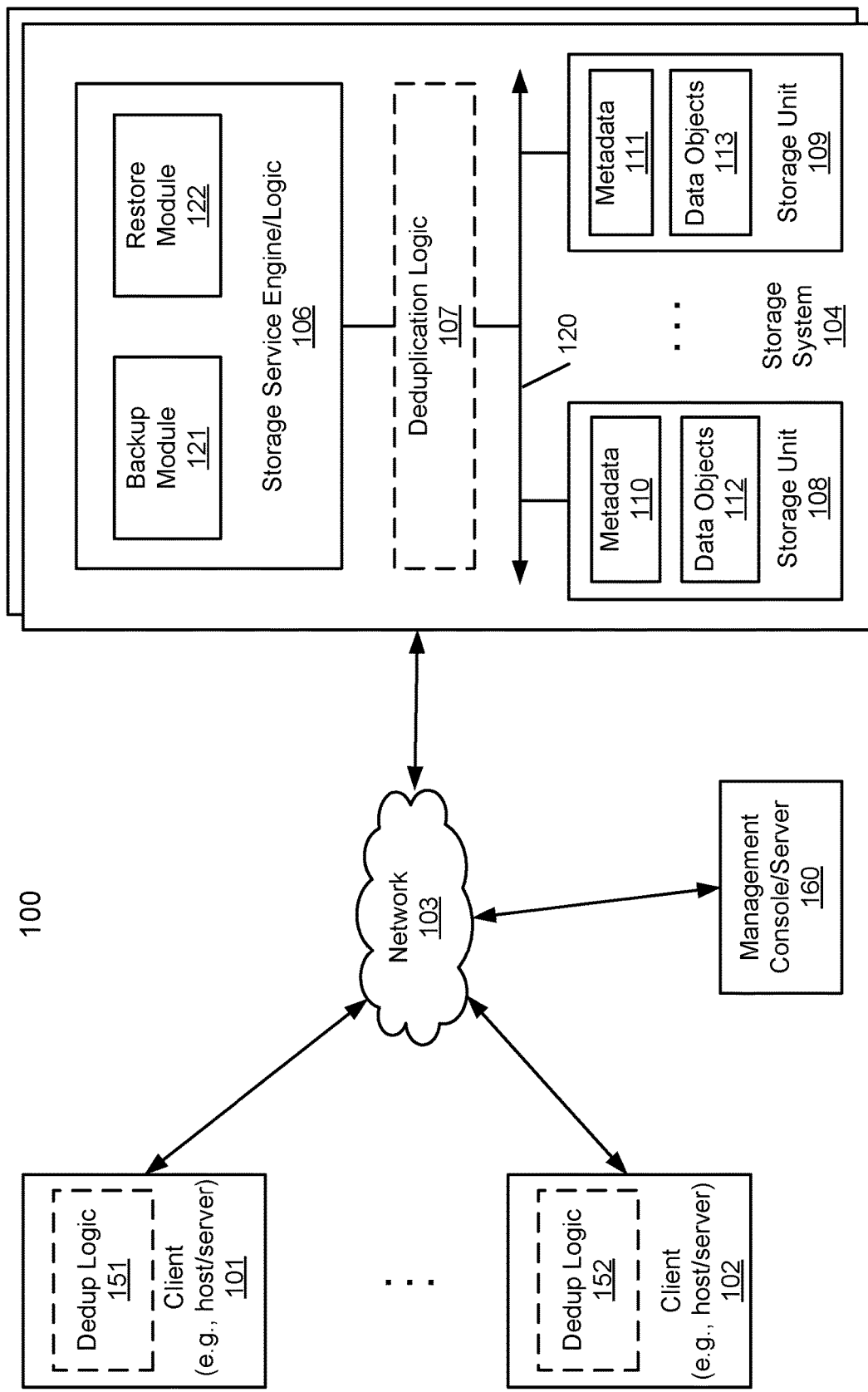
FIG. 1 is a block diagram illustrating an example environment in which embodiments of the disclosure may be practiced.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

An Array Group (AGRP) can be created on any node in a cluster and can migrate to any node in the cluster but can only be assembled on one node at a time. The AGRP may have a unique ID that upper level processes can use to identify and manage the AGRP and its arrays. The cluster uses a shared protection pool that may allow any node in the cluster to access any part of a data storage. In this manner, a collection of partitions can dynamically grow and shrink (when supported by Data Domain File System (DDFS)). In addition, when a node in the cluster fails, the collection of partitions can be migrated to another node so the access to its storage can be maintained. The protection pool also can provide a protected storage that is resilient against at least dual disk and/or single node failures. Changing arrays from directly accessing physical disks to virtual disks may provide a flexibility to where the data reside. Each virtual disk may include a list of Physical Extents (PEs) that indicate the actual data location. The location of the PE can be anywhere within a cluster.

Embodiments of the disclosure relate to a method, apparatus, and system for adding a disk in a redundant array of independent disks (RAID) system with a protection pool of storage units includes receiving a request to add a new physical disk to a storage cluster and partitioning the new physical disk into a set of physical extents. The method further includes allocating one or more physical extents of the set of physical extents of the new physical disk to at least one array of physical extents, wherein the array of physical extents is distributed across physical disks of the storage cluster.

Embodiments include generating a physical extent map for the set of physical extents of the new physical disk and adding the set of physical extents to a list of free physical extents available to be allocated to an array.

Embodiments include determining whether a local disk manager is available to manage the new physical disk to be added to the storage cluster.

Embodiments include, in response to determining that a local disk manager is available, adding the new physical disk to the local disk manager. Embodiments include, in response to determining that a local disk manager is not available: creating a new local disk manager to manage the new physical disk and adding the new physical disk to the new local disk manager.

Embodiments include registering the new local disk manager with one or more nodes of the storage cluster to make the set of physical extents of the new physical disk available to be allocated to arrays of the one or more nodes.

In one embodiment, allocating the one or more physical extents of the set of physical extents of the new physical disk to at least one array of physical extents includes determining to migrate one or more source physical extents of another physical disk to the one or more physical extents of the new physical disk, wherein the one or more source physical extents are associated with the at least one array, replacing the one or more source physical extents in the at least one array with the one or more physical extents of the new physical disk, and migrating data from the one or more source physical extents to the one or more physical extents of the new physical disk.

Using a protection pool strategy as described above, cluster capacity and performance can be expanded by adding additional nodes. This allows customers to buy smaller capacity nodes and scale the cluster incrementally as requirements change.

In another aspect of the disclosure, embodiments of the present disclosure also provide a non-transitory machine-readable medium and a data processing system perform the processes as described above.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of network such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NF S) protocol, common Internet file system (CIF S) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related component configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107, 151, and 152 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Protection pool architecture can be designed to work both in virtual and purpose-built backup appliance (PBBA) environments. In addition, the architecture may be extended to adapt easily to hyper converged solutions. The protection pool may be managed by a Physical Extent Manager (PEM) running on each node in the cluster. The PEM on each node may manage the AGRP running on the same node. When capacity is added, the PEM may request allocation of Physical Extents from the Local Disk Manager (LDM) on each node. The array ownership of a Physical Extent (PE) is determined by the LDM owning the disk and all its PEs. When there is a competition between two PEMs creating arrays and requesting the same PE, the LDM may determine which array is granted the PE. The array that is not granted the PE may fail the array creation process and the PEM may need to regenerate a new PE list and request the array create the process again.

A file system includes one or more file system blocks. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below.

Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block.

There are at least fifteen block pointer entries in a block pointer array contained in an inode of a file. The first of up to twelve entries of block pointers in the inode directly point to the first of up to twelve data blocks of the file. If the file contains more than twelve data blocks, then the thirteenth entry of the block pointer array contains an indirect block pointer pointing to an indirect block containing pointers to one or more additional data blocks. If the file contains so many data blocks that the indirect block becomes full of block pointers, then the fourteenth entry of the block pointer array contains a double indirect block pointer to an indirect block that itself points to an indirect block that points to one or more additional data blocks. If the file is so large that the indirect block becomes full of block pointers and its descendant indirect blocks are also full of block pointers, then the fifteenth entry of the block pointer array includes another level of indirection where the block pointer entry contains a triple indirect block pointer to an indirect block that points to an indirect block that points to an indirect block that points to one or more additional data blocks. Similarly, there exists fourth and fifth level of indirections. Once the indirect blocks at last level of indirection and its descendant indirect blocks become full of pointers, the file contains a maximum permitted number of data blocks. Further, an indirect block at the last level of indirection is also referred to as a leaf indirect block.

Figure 2:
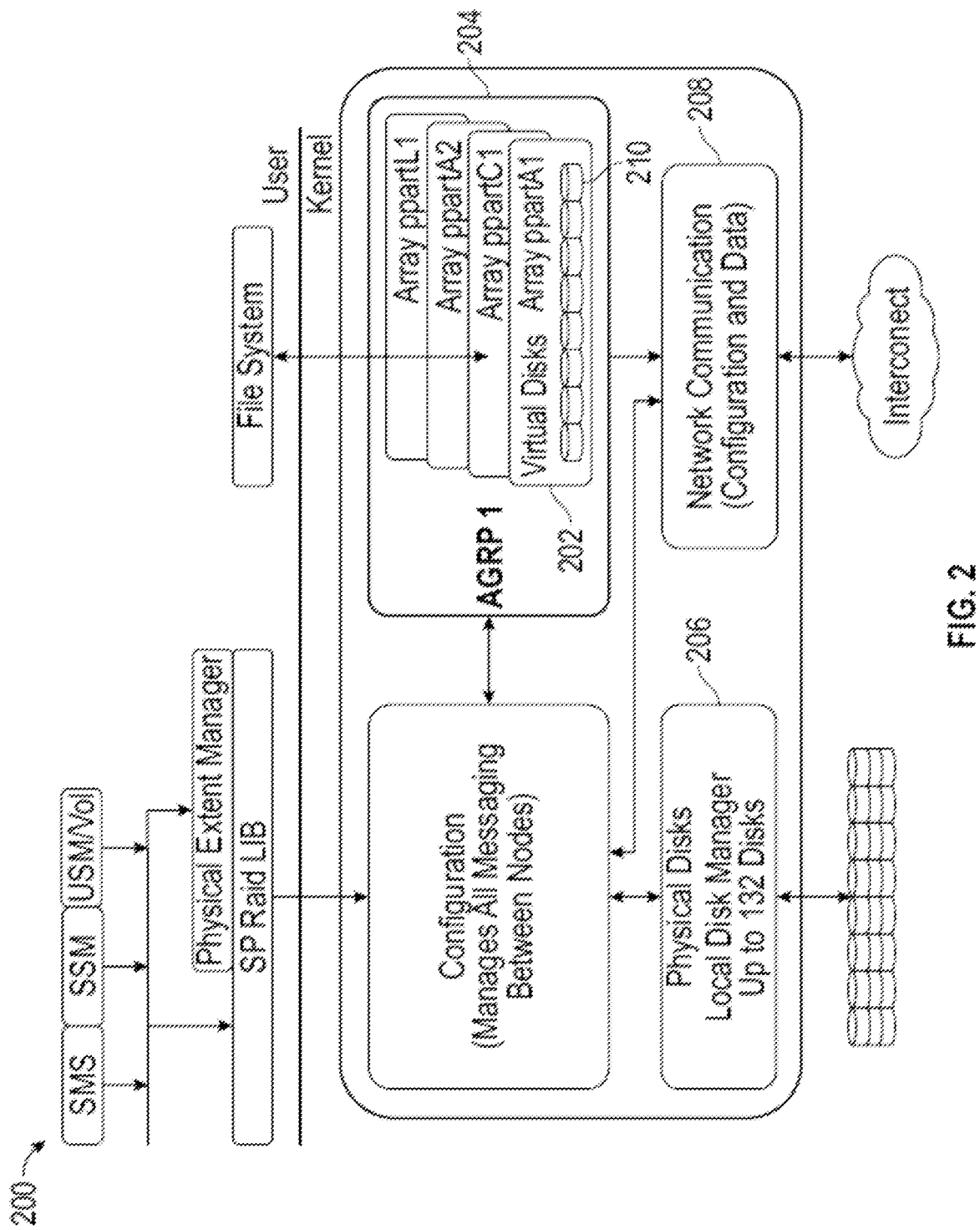
FIG. 2 is an illustration depicting an example of a protection pool driver according to one embodiment.

FIG. 2 is an example of a protection pool driver at one node according to one embodiment. In one embodiment, for example, the protection pool driver may be a Linux kernel module that may be based on the current DD RAID driver providing a stable code base. The main areas of change are in the areas of physical disk management and array management, network management and data transfer. The I/O graphing engine may remain unchanged. The current DD RAID driver manages arrays as part of a Disk Group which ties an array to a physical disk. The protection pool driver may separate the arrays from disk groups. As shown, array group (AGRP1) 204 may include a group of arrays. The group of arrays are then modified to use virtual disks 202 that may include a list of physical extents (PE) 210. In one embodiment, each of the PE may be designated with an address. Therefore, a virtual disk 202 may include a list of addresses that may point to a specific location on a physical disk 206 on a same or different node. The list of addresses may be represented by UUID. The PE may be mapped to a physical disk 206 across the cluster. The disk I/O processing code may have a network component 208 added so when an I/O request is issued it may be redirected to the owning node/disk. Network component 208 may interconnect to other nodes in kernel driver layer. The receiving node may process the I/O request using the existing make disk request code. Once the I/O request is complete, the results may be returned to the requesting node.

A virtual disk 202 may include one or more PEs that may represent a stripe unit index within an array. Virtual disk objects are contained in a virtual disk set and each virtual disk represents a stripe unit index in an array. Up to 24 PEs can be assigned to each virtual disk 202. Each row of PEs in the virtual disk 202 set may act like a small array within the parent array. The allocation of each row may follow the basic rule that each PE in the row is allocated from a different physical disk.

In one embodiment, for example, Local Disk Manager (LDM) may manage the virtual disks 202 on a single node. LDM may divide each virtual disk 202 into PEs and manage the allocation and ownership of these PEs. In another embodiment, the Array Group (AGRP) may manage the arrays that makeup a collection of partitions. The AGRP may manage the creation of arrays and generate a single UUID that can be used to manage all the arrays for reassembling process and migration to another node. The AGRP includes a collection of arrays that belong to the same file system collection partition. Only one AGRP may belong to the same collection partition. The AGRP may be responsible for managing the creation, reconstruction, reassemble, disassemble, and destruction for all associated arrays. The AGRP can be created on any node in the cluster and can migrate to any node in the cluster but can only be assembled on one node at a time. The AGRP may have a unique ID that upper level processes can use to identify and manage the AGRP and its Arrays.

Figure 3:
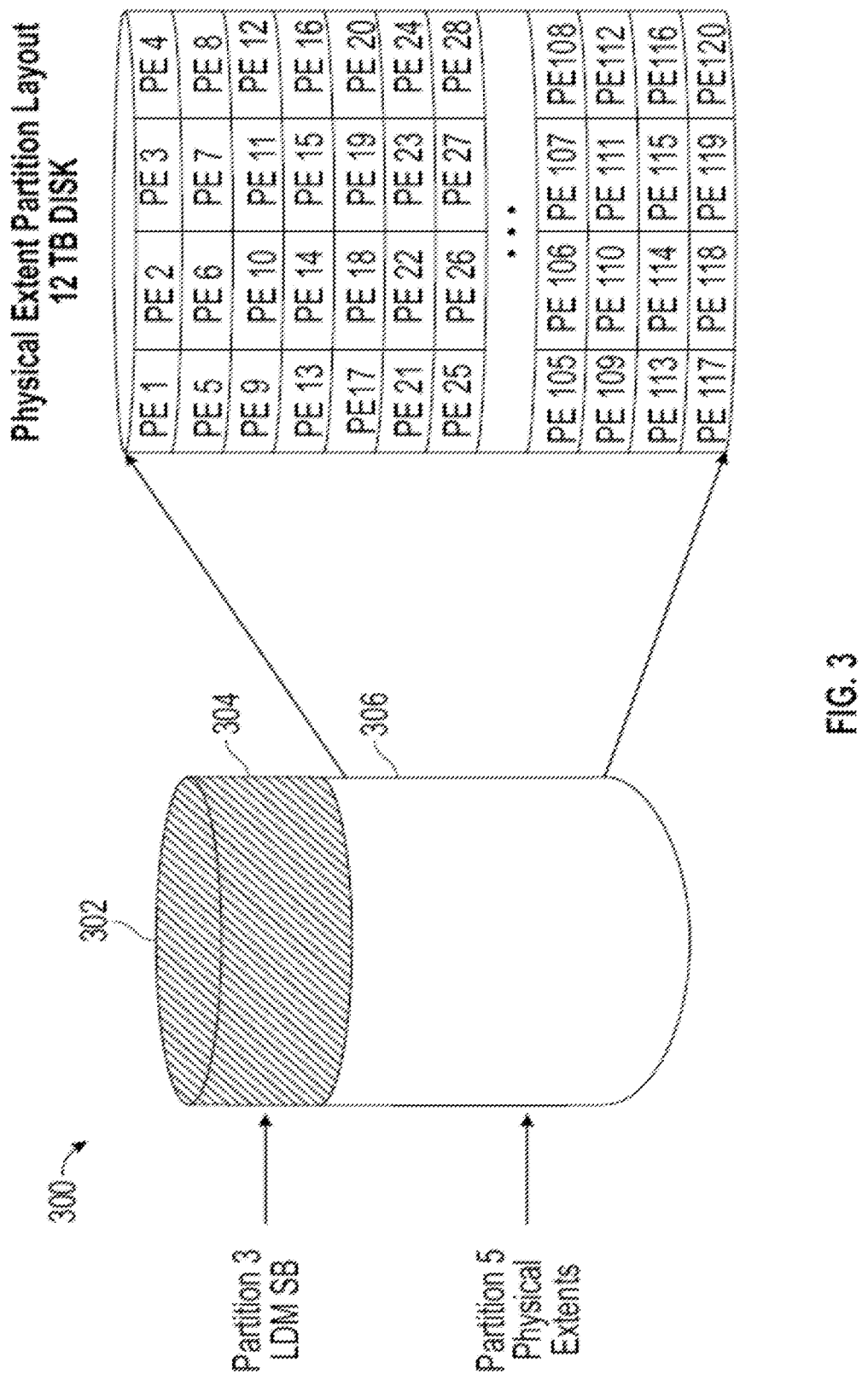
FIG. 3 is an example of a physical extent partition layout according to one embodiment FIG. 4 an example of a PE layout for a cluster in a multi-node environment according to an embodiment

FIG. 3 is an example of a physical extent (PE) partition layout 300 according to one embodiment. PEs are the basic unit of a storage allocation in the protection pool. A PE is a span of contiguous Logical block addressing (LBA) on a physical disk 302. The physical disk 302 may be divided into a number of PEs, wherein each PE has an equal size. The size of a PE may be the same for all PEs across the cluster. The physical disk 302 may be divided into partition 3 304 and partition 5 306. Partition 3 may include metadata storing the mapping information between the PE and the location on the physical disk. As shown in FIG. 3, a 12 Terabyte (TB) partition of a physical disk 302 may be divided into equally sized PEs. The PEs may be contained within a partition on a disk. For example, as illustrated in FIG. 3, Partition 5 306 may include 120 PEs (e.g., PE1, PE2, PE3, PE120). In this manner, keeping the PEs within a partition 5 allows the disk to be used for multiple uses if needed. It may not be a requirement that all physical disks in the cluster have the same capacity. In one embodiment, all physical disks may have the same capacity for a PE allocation management. In some embodiments, for example, the PE size for a protection pool cluster may be 96 Gigibyte (GiB) for a virtual appliance and may be 186 GiB for a standalone PBBA.

Figure 4:
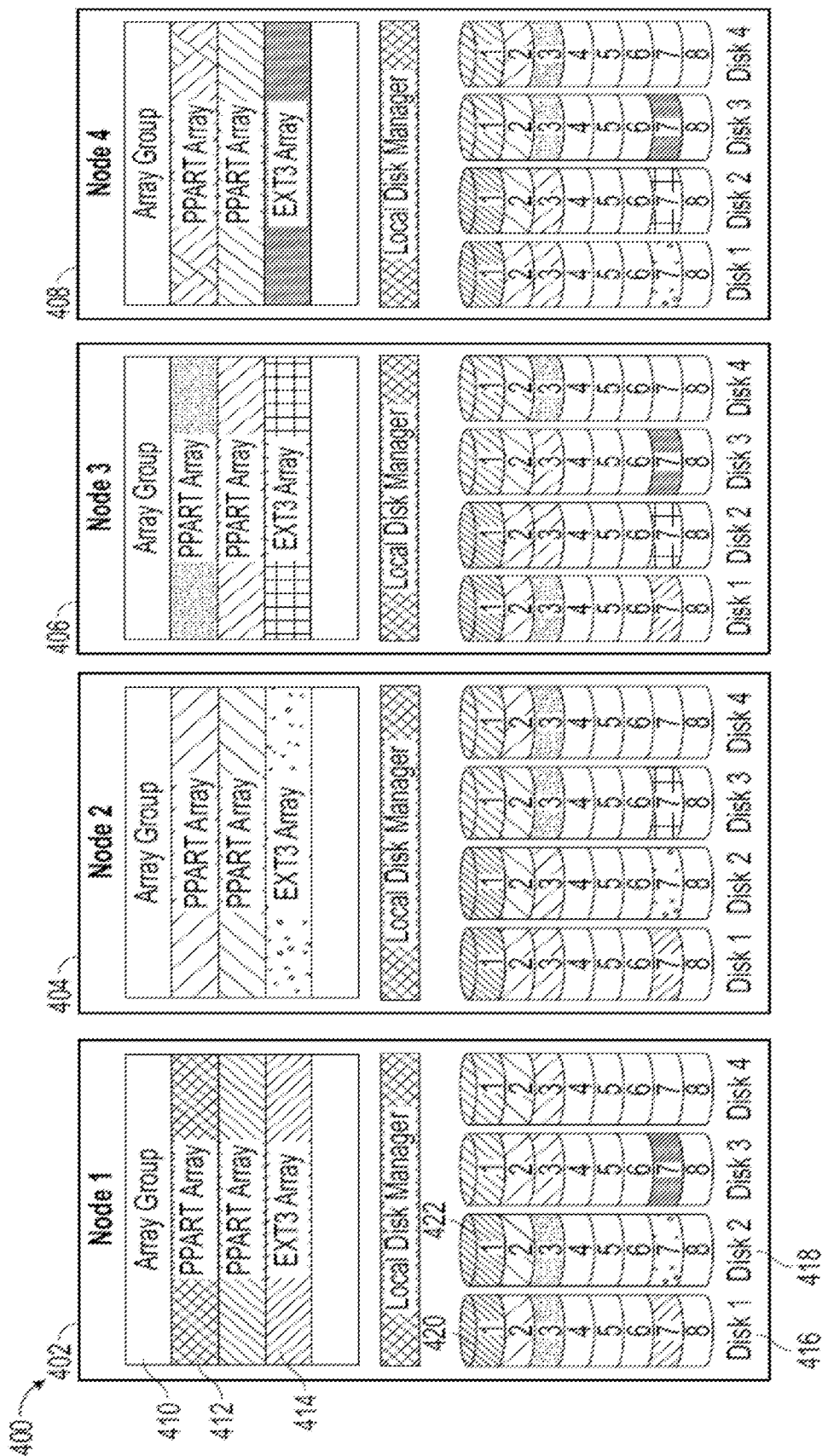

FIG. 4 illustrates an example of a PE layout for a cluster 400 in a multinode environment according to an embodiment. Referring to FIG. 4, the cluster 400, for example, may include a four-node cluster in which each node has an array group (e.g., 410) with two PPART 6+2 arrays (6 data drives and 2 parity drives) and one EXT3 3-way mirrored array. In one embodiment, the parity drives may include XOR and Reed Solomon parity drives.

As shown, each node may include four virtual disks (Disk1, Disk2, Disk3, Disk4). A virtual disk (e.g., Disk1) can support multiple PEs (e.g., 8 PEs). The number (1, 2, 3, 4, 5, 6, 7, 8) on each virtual disk represents PE number. As shown in FIG. 4, each virtual disks include a specific PE having a specific number. For example, Disk1, Disk2, Disk3, Disk4 can include PE #1. Two virtual disks (e.g., Disk1 416 and Disk2 418) on each node can include one PE (PE #1 420 and 422). Disk1 and Disk2 on nodes 402, 404, 406, 408 can include PE #1 associated with the data of PPART Array 412. Data associated with EXT3 Array 414 can be distributed in PE #7 in Disk1 on nodes 402, 404, 406. In this manner, this PE layout 400 can support two failed physical disks or one failed node. Note that the number of PE within a virtual disk of the present disclosure is not limited to what is shown in the layout of FIG. 4.

As previously described, node 1 402 may include array group 410 having three arrays. Data associated with the first array of the array group 410 in node 1 402 are distributed to each node in the cluster 400. In this manner, data can be spread across multiple nodes.

A collection of physical extents (PE) that are grouped together can create an array. The PEs are grouped into virtual disks with up to 24 PEs per virtual disk. There is no restriction as to which physical disk or node the PE resides on, but the allocation of PEs on physical disks for an array may be managed so that PEs in one PE row are not allocated on the same physical disk.

PEs are managed by the Physical Extent Manager (PEM) and PE ownership is verified and approved by the owning LDM at array creation, array expansion or allocation of a spare PE. Arrays may be created for different uses and RAID levels. Some arrays may be created for use by only the local node used for Operating System (OS) and configuration data relevant to that node. When an array is created, the RAID level is assigned and there is no requirement that all the arrays have the same RAID level or the same number of PEs. All the RAID levels supported by the current DD RAID driver are supported in the protection pool driver.

The Protection pool driver uses a 128-bit UUID that is used to identify AGRPs, Arrays, LDMs, LDM Disks, and Physical Extents. The UUID layout allows mapping of Arrays to AGRPs or a PE offset to a disk, a LDM and a Node. Below table illustrates an example of the 128-bit UUID.

| Type | Bits 95-127 | Bits 64-95 | Bits 32-63 | Bits 0-31 |
| --- | --- | --- | --- | --- |
| AGRP UUID | AGRP Magic Number | 32 bit AGRP UID | Reserved | Reserved |
| Array UUID | AGRP Magic Number | 32 bit AGRP UID | 32 bit Array UID | Reserved |
| LDM UUID | 32 bit Node UID | 32 bit LDM UID | Reserved | Reserved |
| LDM Disk UUID | 32 bit Node UID | 32 bit LDM UID | 32 bit disk UID | Reserved |
| PE UUID | 32 bit Node UID | 32 bit LDM UID | 32 bit Node UID | 32 bit PE Offset |

Each PE may be assigned a UUID (herein after "PE UUID") when an associated disk is added to an LDM. PE UUID may be used to identify the location of the extent. The PE UUID may include four 32-bit parts that may describe the location of each PE. In some embodiments, the PE UUID may include a NODE UUID, LDM UUID, DISK UUID, and the PEs physical LBA offset within the PE partition of the disk. One example of the PE UUID is shown below:

| Node | | LDM | Disk | Extent | |
| --- | --- | --- | --- | --- | --- |
| Row: 1 Vdisk: 0 | 0x11111111: | 0x620E0700: | 0xE1640700: | 0x00000008 | In Use |
| Row: 1 Vdisk: 1 | 0x11111111: | 0x620E0700: | 0x4646F000: | 0x00000008 | In Use |
| Row: 1 Vdisk: 2 | 0x22222222: | 0xA6D7FD00: | 0x5A46D400: | 0x00000008 | In Use |
| Row: 1 Vdisk: 3 | 0x22222222: | 0xA6D7FD00: | 0xF479BA00: | 0x00000008 | In Use |
| Row: 1 Vdisk: 4 | 0x33333333: | 0xFD5D6200: | 0xE3839B00: | 0x00000008 | In Use |
| Row: 1 Vdisk: 5 | 0x33333333: | 0xFD5D6200: | 0x6BA23600: | 0x00000008 | In Use |
| Row: 1 Vdisk: 6 | 0x44444444: | 0x7FB69600: | 0x62521800: | 0x00000008 | In Use |
| Row: 1 Vdisk: 7 | 0x44444444: | 0x7FB69600: | 0x215B7500: | 0x00000008 | In Use |

The 128-bit AGRP UUID is used to keep all the arrays that make up a collection partition under one umbrella. The AGRP UUID may include a 32-bit magic number and a 32-bit AGRP UID. As arrays are created, the Array UUID is created by using the AGRP base UUID and adding the 32-bit Array UID. Keeping the Arrays under the AGRP UUID allows the AGRP and all its components to move to different nodes by only using the AGRP UUID.

The 128-bit LDM UUID is used for multiple purposes. It indicates which node owns the LDM, and which disks belong to the LDM. Also, it provides the PE location. When a LDM is created the base LDM UUID is made up of the node UID and the LDM UID. As each disk is added a disk UUID is created for each, it uses the LDM base UUID and adds the disk UID. When PE UUIDs are created the PE offset is shifted right 23 bits and that value becomes the PE UID. The PE UID is then added to the disks UUID to create a PE UUID for each PE.

When processing a I/O disk request from the file system, the array passes information associated with the PE. The information associated with the PE may include the PE UUID identifying a PE location, a stripe offset within the PE, and a data buffer.

Figure 5:
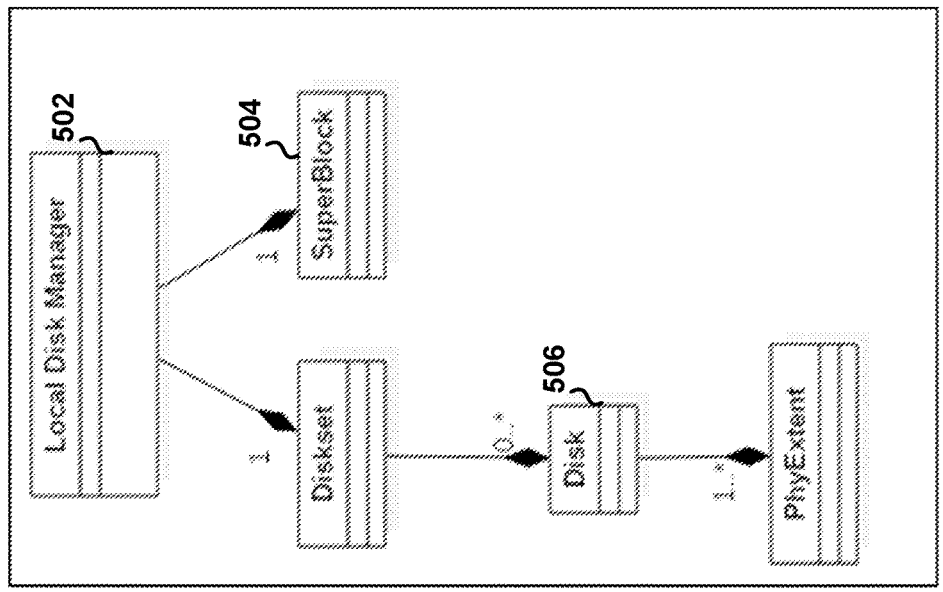
FIG. 5 is an illustration depicting an example of local disk manager according to one embodiment.

FIG. 5 shows an example of Local Disk Manager (LDM) architecture according to one embodiment. LDM 502 may replace Disk Group module. LDM 502 manages the physical disks on a node. LDM 502 may be responsible with an initial creation of a PE map, PE allocation, proactive disk error monitoring, disk failure management, maintaining the current state of disks and PEs, and managing LDM Meta data in SP RAID superblock 504. One or more LDMs 502 can be present on a single node. Having more than one LDM 502 may allow disks 506 to be grouped based on disk characteristics. A single LDM 502 can manage up to 132 disks (2 DS60 and one shelf of cache disks). The LDM 502 may manage allocation and current ownership of a devices PEs, as arrays are created the creation process may request allocation from all LDMs owning PEs. The LDM may allocate the PEs and store the current owner in LDMs superblock data. When the system is booted the LDM may provide the current state for all PEs to upper level processes. When disk(s) are added to an LDM each disk may have a performance group assigned. This may allow the Physical Extent Manager to allocate array in different performance tiers. The LDM may also monitor the physical disk error counters and notify the Physical Extent Manager (PEM) that a disk has exceeded an error threshold and needs to be replaced. When a write error occurs, the array may fail the PE and notify the LDM that the PE has failed. The LDM may fail the disk, notify each array that have PEs allocated on the failing disk, broadcast a message to PEMs on all nodes indicating a disk failed, all arrays that failed PEs may run in a degraded state until a replacement PE is issued from PEM, when the array received new PE(s) a reconstruction is started.

Figure 6:
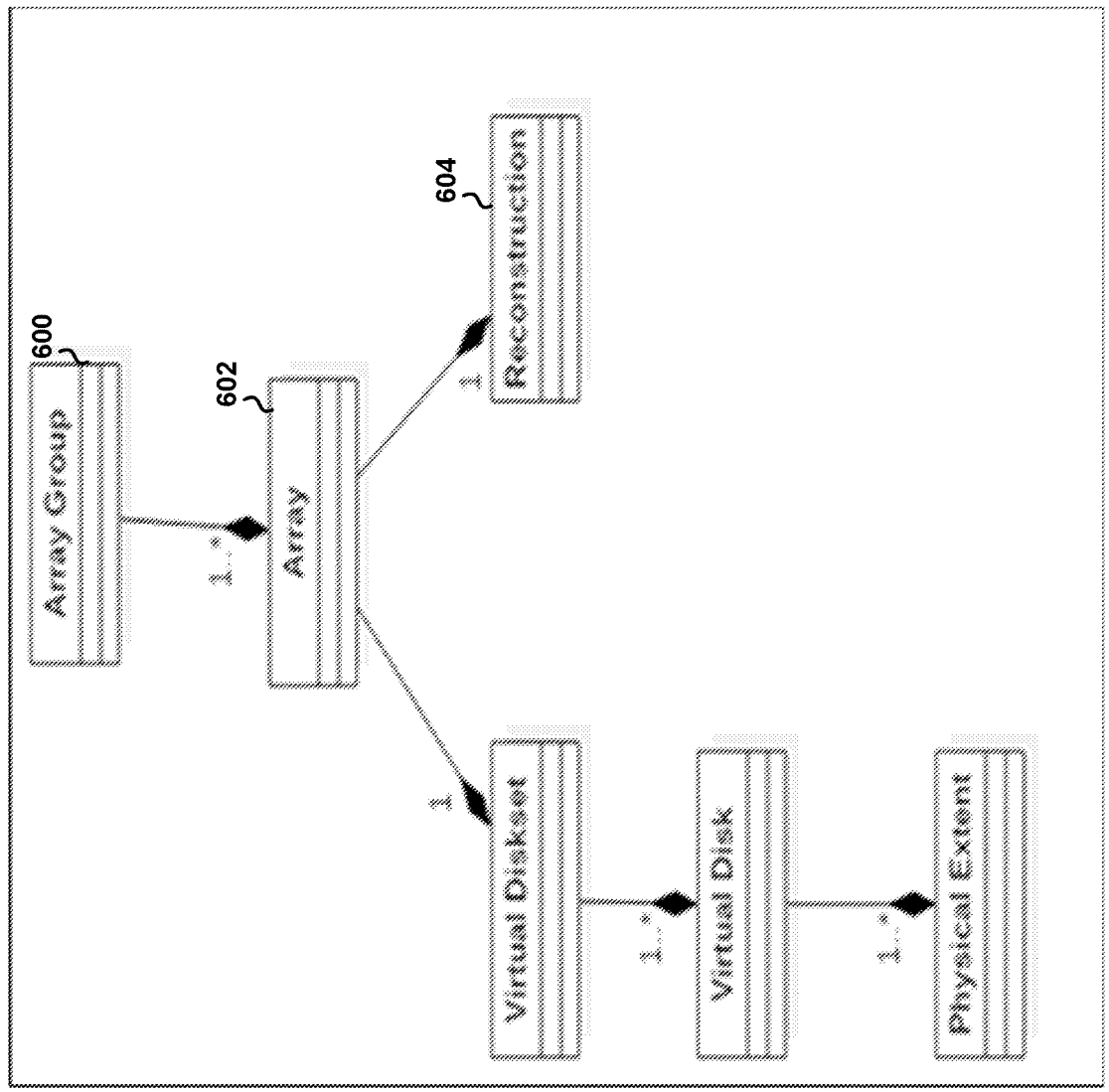
FIG. 6 is an illustration depicting an example of array group according to one embodiment.

FIG. 6 shows an example of an Array Group (AGRP) 600 having a collection of arrays 602 that belong to the same file system collection partition according to one embodiment. In one embodiment, only one array group can belong to the same collection partition. The array group 600 may be configured for managing the creation, reconstruction, reassemble disassemble and destroying all associated arrays 602. The AGRP 600 can be created on any node in the cluster and can migrate to any node in the cluster but can only be assembled on one node at a time. The AGRP 600 may have a unique ID that upper level processes can use to identify and manage the AGRP and its arrays.

There are two types of reassembles: 1) LDM and 2) AGRP. When a node is booted the LDM may be reassembled when PEM module is started. This may allow all the nodes in the cluster to gather the necessary information to manage AGRP reassembles. The LDM provides AGRP reassembly data and state for all PEs managed by that LDM. The LDMs contain metadata information of all AGRPs. Once there are enough LDMs available the AGRP can be reassembled on their respective nodes. The ARGP reassemble is directed by a cluster manager through Volume and may instruct the nodes to reassemble specific AGRPs. AGRP reassemble all its associated arrays, during the array reassemble the state of its PEs are verified. The AGRP and its arrays can only be assembled on one node at a time but can be assembled on any node in the cluster.

Reconstructions may be started for many reasons (e.g., user request fail disk, failed write on a PE, rebalancing, exceed error thresholds). The reconstruction process may be managed by the PEM and performed on PE boundaries. Four types of reconstruction may be supported including full, copy, migrate and failback. The reconstruction of PEs from one physical disk may use spare PEs from multiple physical disks, because there are multiple PEs being reconstructed this allows simultaneous reconstructions. Having multiple concurrent reconstructions reduces the overall reconstruction time. When performing distributed sparing, it may cause rebalancing overhead once the failed disk is replaced. Once a disk is added to an LDM, PEM may start slowly migrating PEs to the newly added disk.

A file system collection partition contains elements from the active tier, cache tier and cloud tier, in the current DD RAID driver each tier is identified in the associated Disk Group. The protection pool driver no longer supports the concept of a Disk Group and the tier may be identified in each array in an AGRP.

Figure 7:
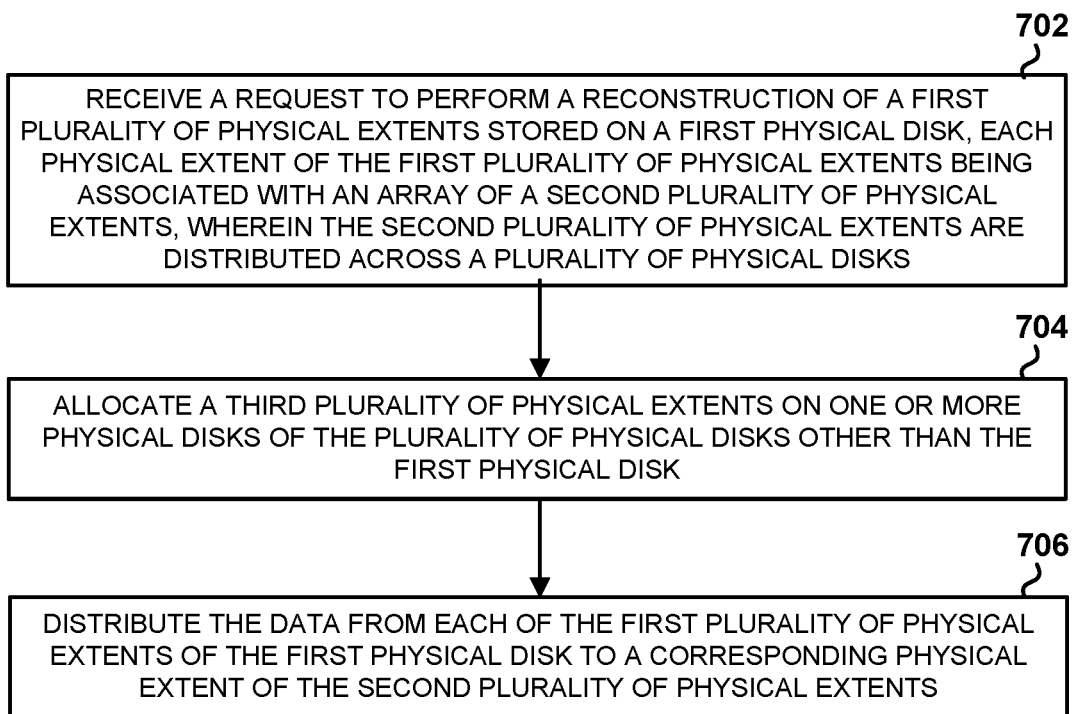
FIG. 7 a flow diagram illustrating method of performing a general data reconstruction of a physical extent according to one embodiment

FIG. 7 is a flow diagram illustrating method 700 for performing a general data reconstruction of data from physical extents of one physical disk to physical extents of other physical disks of multiple nodes in a cluster according to one embodiment. For example, method 700 can be performed by PEM, LDM, AGRP, Array, or a combination of such, which can be implemented in software, firmware, hardware, or any combination thereof.

Referring now to FIG. 7, at block 702, processing logic (e.g., PEM) receives a request to perform a reconstruction of a first set of physical extents stored on a first physical disk of multiple physical disks in a storage cluster. Each physical extent of the first set of physical extents is associated with an array of a second set of physical extents. The second set of physical extents may be distributed across the set of physical disks (i.e., the Array includes physical extents distributed throughout the cluster). A reconstruction may be started for many reasons (e.g., user request fail disk, failed write on a PE, rebalancing, exceed error thresholds). The reconstruction process may be managed by the PEM and performed on PE boundaries. Four types of reconstruction may be supported including full, copy, migrate and failback. The reconstruction of PEs from one physical disk may use spare PEs from multiple physical disks. Because there are multiple PEs being reconstructed to PEs of multiple physical disks, simultaneous reconstructions of the PEs can be performed rather than serial performance of the PEs in an Array. Having multiple concurrent PE reconstructions reduces the overall reconstruction time. When performing distributed sparing, it may cause rebalancing overhead once the failed disk is replaced. Once a disk is added to an LDM, PEM may start slowly migrating PEs to the newly added disk.

In one embodiment, at block 704, the processing logic allocates a third set of physical extents (i.e., spare PEs) on one or more physical disks of the cluster other than the first physical disk. For example, the first physical disk may be failed, removed, or load balancing is being performed to move the data from the first physical disk to another. Thus, the processing logic allocates the spare PEs across other operating disks other than from the first physical disk. In one example, the spare PEs may be allocated before or after receiving the request for reconstruction.

In one embodiment, at block 706, the processing logic distributes the data from each of the physical extents of the first set of physical extents of the first physical disk to a corresponding physical extent of the third set of physical extents. For example, the data that was previously stored at a physical extent of the first disk is fully reconstructed, copied, or migrated to one of the spare PEs allocated and assigned to the Array at block 704.

Figure 8A:
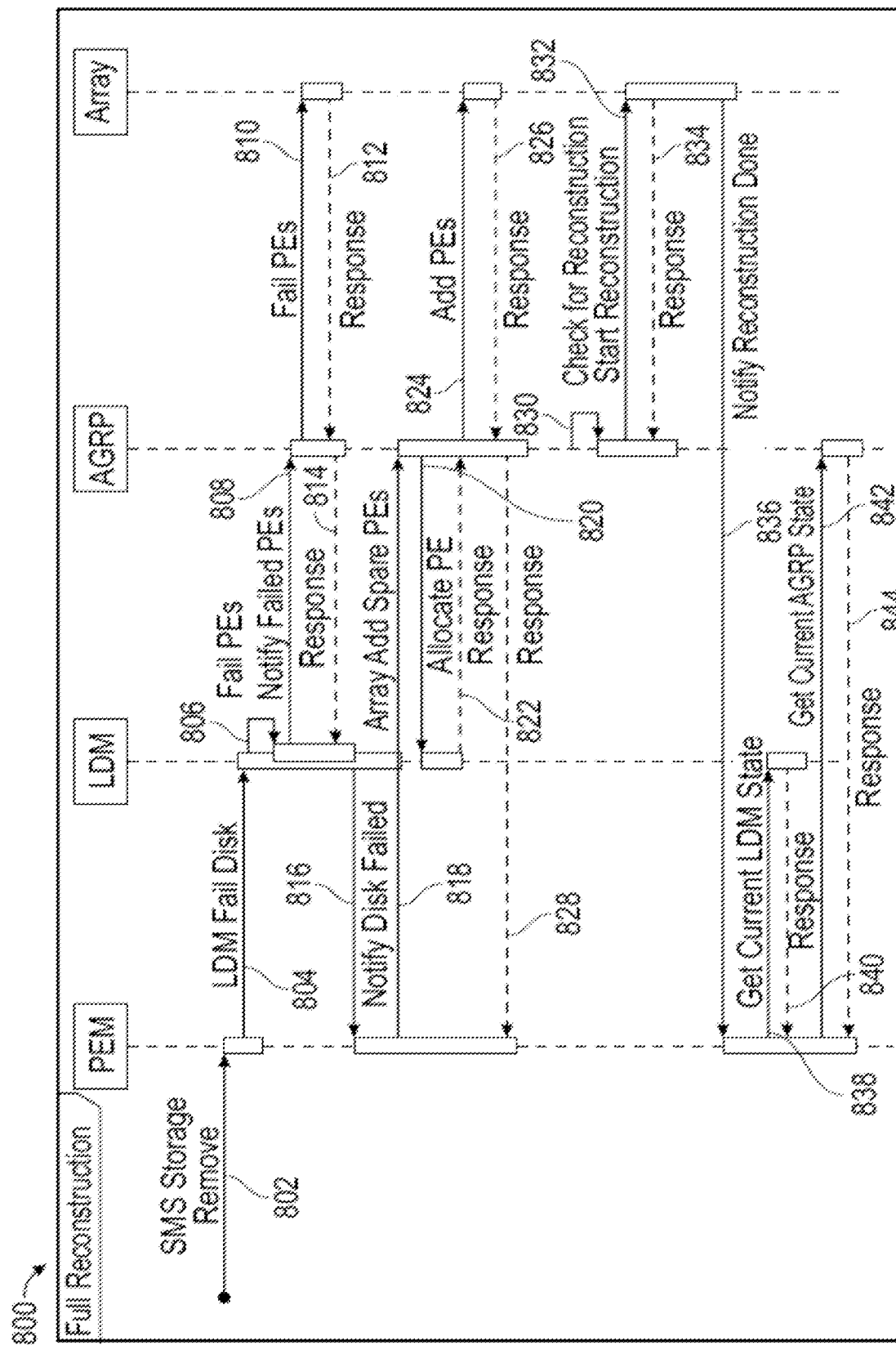
FIG. 8A is a flow diagram illustrating an example method of performing a full data reconstruction in a RAID data storage system with a protection pool of storage units in response to a user request, according to some embodiments

FIG. 8A shows a detailed flow diagram 800 of performing a full data reconstruction in a RAID data storage system with a protection pool of storage units in response to a user request, according to some embodiments.

At step 802, the PEM receives a SMS storage remove command. The SMS storage remove command may be a command or request to remove a physical disk from the storage cluster. For example, an administrator of the cluster may need to remove, replace, or otherwise stop operation of a physical disk in the cluster (e.g., for maintenance or the like) and thus may initiate the SMS storage remove via an interface of the storage cluster. The SMS storage remove may indicate a particular physical disk to remove. At step 804, in response to receiving the SMS storage remove command, the PEM may send a request to the LDM of the node to fail the physical disk. At step 806, in response to the request to fail the disk, the LDM may initiate failing of each of the PEs on that physical disk. Because the storage of Arrays are distributed across different physical disks and nodes of the storage cluster, each PE needs to be treated independently to be failed. At step 808, the LDM notifies the AGRP for each PE being failed. The AGRP then notifies, at step 810, the appropriate Array in which the failed PE is included. Accordingly, both the Array and AGRP are aware of the failed PE and will operate with the failed PEs in a degraded state. Corresponding responses are provided from the Array to the AFRP (step 812) and from the AGRP to the LDM (step 814).

Upon successful failure of the physical disk and the PEs of the disk, at step 816, the LDM notifies the PEM that the disk has been successfully failed. At step 818, the PEM allocates replacement PEs to the Arrays that include one or more failed PEs and issues a command to add spare PEs to each of the affected Arrays via AGRP. The command may include a list of spare PEs available to be allocated. At step 820, the AGRP may send an allocation request to each LDM in which a new PE is to be located. Each allocation request may include a list of the new PEs that are to be allocated within the storage managed by the LDM. The LDM may response with a grant of the requested allocation (step 822). The AGRP may then request Arrays to add the new PEs to the failed virtual disk and PE row (step 824). The Array may respond that the PEs were added successfully (step 826) and the AGRP may respond to the PEM that the Array successfully added the list of new PEs (step 828).

After successful allocation of the new PEs to each of the Arrays that included failed PEs on the failed physical disk, reconstruction of the PEs may begin. At step 830, each AGRP may monitor each of the Arrays in the AGRP to determine if reconstruction or migration is needed. If the AGRP identifies one or more Arrays that needs reconstruction to be performed, at step 832 the AGRP issues a command to the Array, or Arrays, to perform a full reconstruction on one or more failed PEs in the Array. Each of the one or more Arrays may then provide a response to the AGRP that the reconstruction has been started (step 834). The Array may then perform the reconstruction as a background operation. The different Arrays may perform reconstructions of its failed PEs simultaneously with one another.

After an Array completes its corresponding reconstruction, at step 836 the Array may notify the PEM that the Array has completed its reconstruction of its failed PEs. The PEM may request the current state of each of the LDM (838) and the AGRP (step 840) and receive a response with the corresponding state of the LDM (step 842) and the AGRP (step 844). Thus, the PEM may obtain the most recent configuration and state of the LDM and the AGRP for proper management of the LDM and AGRP.

Figure 8B:
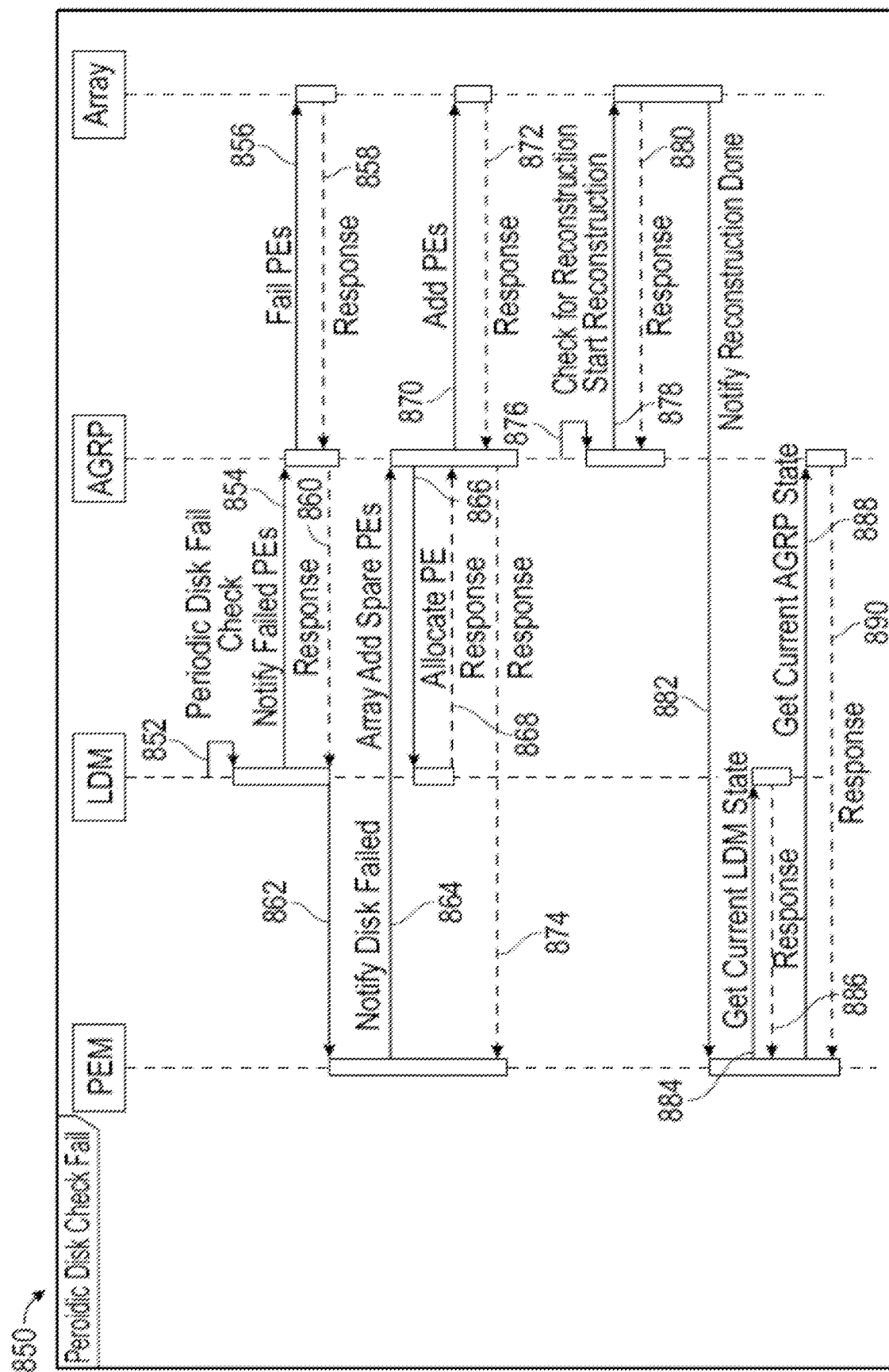
FIG. 8B is a flow diagram illustrating another example method of performing a full data reconstruction in a RAID data storage system with a protection pool of storage units in response to a periodic disk fail check, according to some embodiments

FIG. 8B shows a detailed flow diagram 850 of performing a full data reconstruction in a RAID data storage system with a protection pool of storage units in response to a periodic disk fail check, according to some embodiments.

At step 852, the LDM periodically performs a disk fail check to determine if any disks managed by the LDM have failed. In one example, the LDM may monitor whether a write operation to a disk of the LDM has failed. In another example, the LDM may determine whether a number of failed operations of a disk exceeds an error threshold. In response to determining that a disk is to be failed, the LDM may prepare a list of PEs on the failed disk for each AGRP having PEs allocated on the failed disk. At step 854, the LDM may notify each of these AGRPs of the list of failed PEs allocated on the failed disk. Similar to process 800, the AGRP may then The AGRP then notifies, at step 856, the appropriate Array in which the failed PE is included. Accordingly, both the Array and AGRP are aware of the failed PE and will operate with the failed PEs in a degraded state. Corresponding responses are provided from the Array to the AFRP (step 858) and from the AGRP to the LDM (step 860).

Upon successful failure of the physical disk and the PEs of the disk, at step 862, the LDM notifies the PEM that the disk has been successfully failed. At step 864, the PEM allocates replacement PEs to the Arrays that include one or more failed PEs and issues a command to add spare PEs to each of the affected Arrays via AGRP. The command may include a list of spare PEs available to be allocated. At step 866, the AGRP may send an allocation request to each LDM in which a new PE is to be located. Each allocation request may include a list of the new PEs that are to be allocated within the storage managed by the LDM. The LDM may response with a grant of the requested allocation (step 868). The AGRP may then request Arrays to add the new PEs to the failed virtual disk and PE row (step 870). The Array may respond that the PEs were added successfully (step 872) and the AGRP may respond to the PEM that the Array successfully added the list of new PEs (step 874).

After successful allocation of the new PEs to each of the Arrays that included failed PEs on the failed physical disk, reconstruction of the PEs may begin. At step 876, each AGRP may monitor each of the Arrays in the AGRP to determine if reconstruction or migration is needed. If the AGRP identifies one or more Arrays that needs reconstruction to be performed, at step 878 the AGRP issues a command to the Array, or Arrays, to perform a full reconstruction on one or more failed PEs in the Array. Each of the one or more Arrays may then provide a response to the AGRP that the reconstruction has been started (step 880). The Array may then perform the reconstruction as a background operation. The different Arrays may perform reconstructions of its failed PEs simultaneously with one another. After an Array completes its corresponding reconstruction, at step 882 the Array may notify the PEM that the Array has completed its reconstruction of its failed PEs. The PEM may request the current state of each of the LDM (884) and the AGRP (step 886) and receive a response with the corresponding state of the LDM (step 888) and the AGRP (step 890). Thus, the PEM may obtain the most recent configuration and state of the LDM and the AGRP for proper management of the LDM and AGRP.

Figure 9:
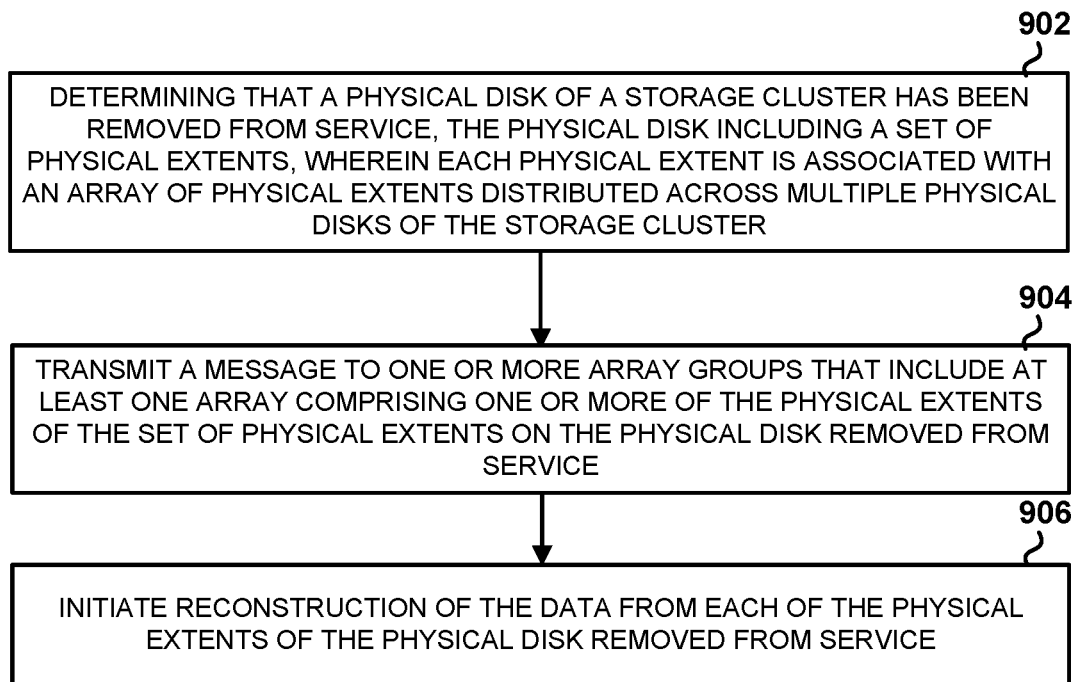
FIG. 9 is a flow diagram illustrating another method of performing a full data reconstruction in a RAID data storage system with a protection pool of storage unit according to one embodiment

FIG. 9 is a flow diagram illustrating method 900 for performing a full data reconstruction in a RAID data storage system with a protection pool of storage unit according to one embodiment. For example, method 900 can be performed by PEM, LDM, AGRP, Array, or a combination of such, which can be implemented in software, firmware, hardware, or any combination thereof.

Referring now to FIG. 9, at block 902, processing logic (e.g., PEM or LDM) determines that a physical disk of a storage cluster has been removed from service, the physical disk including a set of physical extents. In one example, each physical extent of the set of physical extents is associated with an array of physical extents distributed across multiple physical disks of the storage cluster. In one embodiment, only a portion of the set of physical extents are associated with an Array (e.g., some physical extents allocated to an array while some remain spares). As discussed above, each Array may be included within an Array Group (AGRP) for managing a set of Arrays. Accordingly, the physical extents on the physical disk being failed (i.e., removed from service) may be allocated to an Array spanning several physical disks and an Array Group. Each Array may be assigned to one node of the cluster and may be managed by an Array Group of that same node.

In one embodiment, a service person or administrator of the cluster may invoke a disk failure through a service command that instructs the LDM to immediately start the disk fail process. I another embodiment, the LDM may monitor the physical disk error counter and notify the PEM that a disk has exceeded an error threshold and needs to be failed immediately. In another embodiment, when a write error occurs while an Array is processing an I/O request, the Array may fail the PE and notify the LDM that the PE has failed. The LDM may then fail the disk and notify each Array in the cluster that have PEs allocated on the failing disk.

In one embodiment, at block 904, the processing logic (e.g., LDM) transmits a message to one or more Array Groups that include at least one array comprising one or more of the physical extents of the set of physical extents on the physical disk removed from service. A message may be send to PEMs on all nodes indicating a disk has failed. All Arrays that have PEs allocated from the failed disk may run in a degraded state until a replacement PE is issued from the PEM and the reconstructions are complete. After the LDM has failed the disk and notified all affected Arrays and PEMs on all nodes of the cluster, each PEM may initiate the process of allocating replacement PEs. Each PEM may generate a list of new PEs for each Array in the AGRP the PEM is managing. The PE lists may then be sent to each array and the array may request the respective LDMs to allocate the PEs. Once the LDM grants the PE allocations, the PEs may then be added to the virtual disk index and PE row for each array.

In one embodiment, at block 906, the processing logic (e.g., AGRP) initiates reconstruction of the data from each of the physical extents of the physical disk removed from service. The AGRP monitors all its arrays, checking for degraded PE rows. When a degraded PE row is found, the Array and PE row is put in one of two lists. The first list is for PE rows with multiple failed PEs (e.g., two failed PEs). The second list is for PE rows with only one failed PE. The lists are generated to prioritize repair the PE rows that are vulnerable to data loss if another PE reports an error (i.e., the PE rows with multiple failed PEs). Thus, all the PE rows with multiple degraded PEs are reconstructed first, after which the PE rows with a single degraded PE is reconstructed. Accordingly, the reconstruction priority may be to repair the most vulnerable data first.

Figure 10:
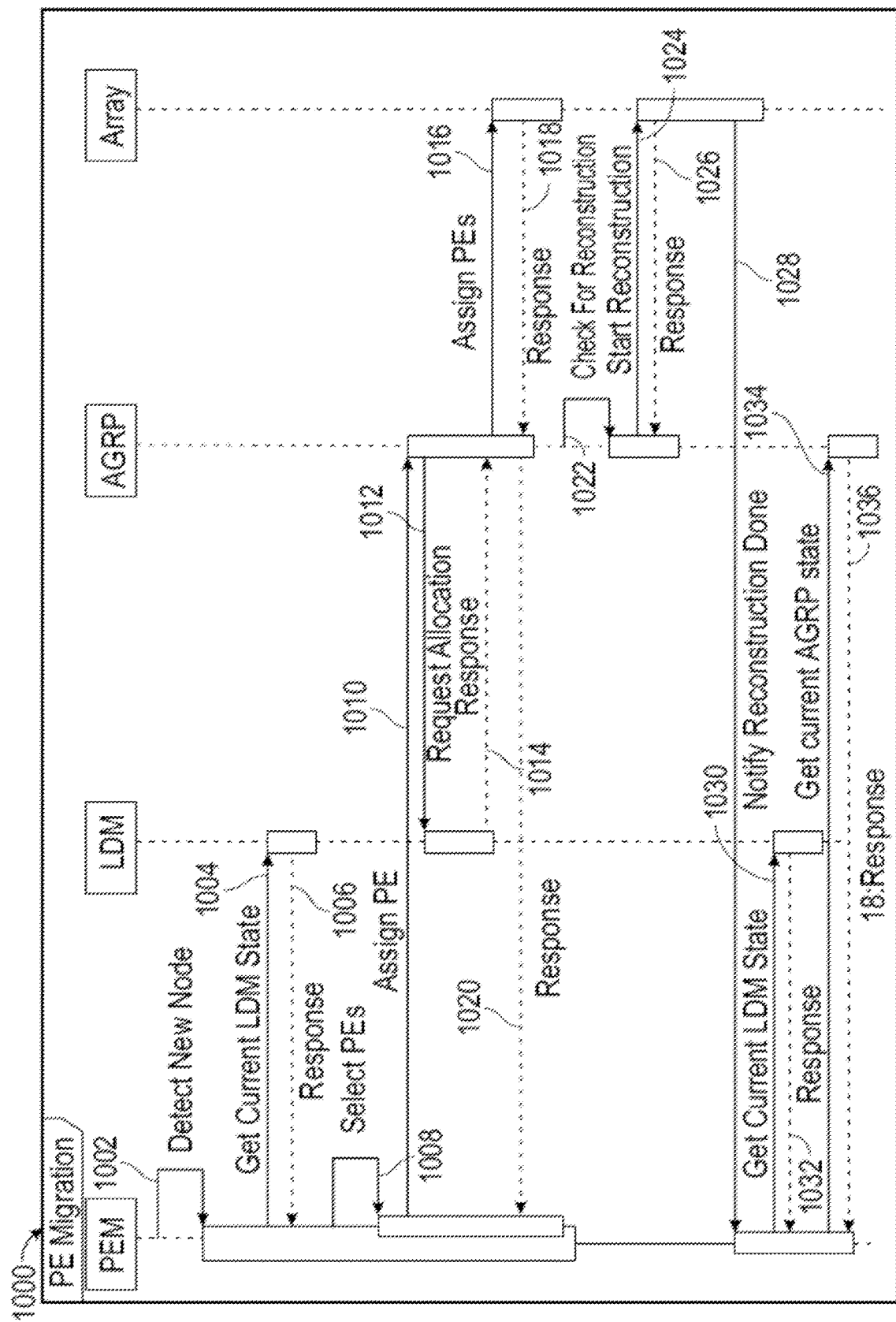
FIG. 10 is a flow diagram illustrating an example method of migrating PE data on a RAID data storage system with a protection pool of storage units, according to some embodiments.

FIG. 10 is a detailed flow diagram 1000 of a method of migrating PE data on a RAID data storage system with a protection pool of storage units, according to some embodiments. For example, method 1000 PEM, LDM, AGRP, Array, or a combination of such, which can be implemented in software, firmware, hardware, or any combination thereof.

Referring now to FIG. 10, at step 1002, processing logic (e.g., PEM) detects that a new node has been added to a storage cluster. At step 1004, the PEM issues a request to all LDMs in the storage cluster to obtain a current state of each LDM and each LDM may return a current configuration of the LDM (step 1006). At step 1008, each PEM may evaluate the new configuration in view of the new node and determines which PE should be migrated to the new node.

At step 1010, the PEMs may issue a local command to each AGRP or Array with a list of PEs to migrate to the new node. Each AGRP may then send a request, to a local LDM on the node of the AGRP, to allocate the new PEs of the new node to one or more Arrays. The LDM may then provide the AGRP a response granting allocation of the PEs (step 1012). At step 1014, the AGRP requests one or more Arrays to add PEs to a failed virtual disk and PE row. The Array may provide a response (step 1016) that the PEs were added to the Array successfully. At step 1018, the AGRP may respond that the Array successfully added the list of PEs. At step 1020, the AGRP performs a periodic check of the all the Arrays to determine if reconstruction or migration is needed. At step 1022, the AGRP issues a migration reconstruction command to one or more Arrays. At step 1024, each Array may provide a response that the migration reconstruction has been started and is running in the background. At step 1026, each Array may notify the PEM that the PE migration reconstruction for the corresponding Array has been completed. At step 1028, the PEM may issue a request to all LDMs in the storage cluster for its currents state and receive a reply form the LDMs with the current configuration data (step 1030). The PEM may then issue a request to a local AGRP for a current state of the AGRP (step 1032) and receive a response (step 1034) from the AGRP including the current configuration data of the AGRP.

Figure 11:
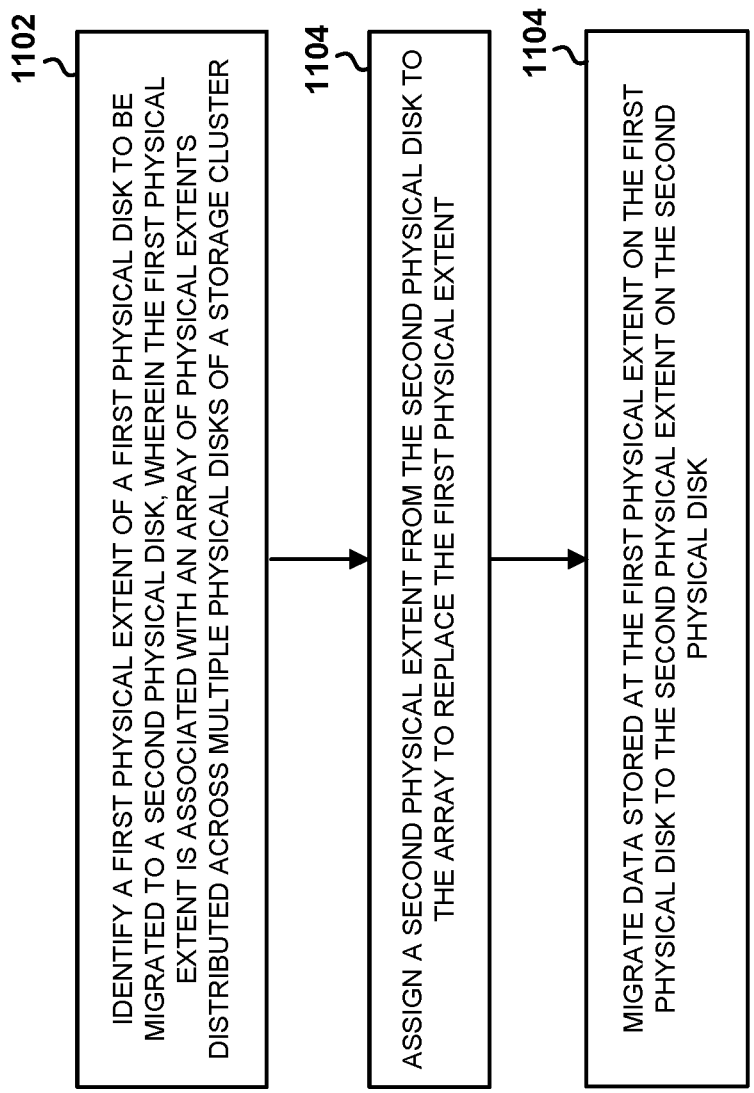
FIG. 11 is a flow diagram illustrating an example method of migrating PE data on a RAID data storage system with a protection pool of storage units according to one embodiment

FIG. 11 is a flow diagram illustrating a method 1100 for of migrating PE data on a RAID data storage system with a protection pool of storage units according to one embodiment. For example, method 1100 can be performed by PEM, LDM, AGRP, Array, or a combination of such, which can be implemented in software, firmware, hardware, or any combination thereof.

Referring now to FIG. 11, at block 1102, processing logic (e.g., PEM or LDM) identifies a first physical extent of a first physical disk to be migrated to a second physical disk, wherein the first physical extent is associated with an array of physical extents distributed across multiple physical disks of a storage cluster. For example, the processing logic may initiate PE migrations in response to a notification that a new node has been added to the storage cluster. In another example, the processing logic may initiate PE migrations in response to detecting that there is a hot spot on one of the disks in the cluster. When a new node is added, the processing logic may evaluate the current Array layouts and rebalance the storage cluster by migrating PEs to a new location in the cluster. For example, if a disk in the cluster is handling more I/O requests than other disks on the same node, the processing logic may evaluate the PEs on the disk and migrate one or more to another disk on the same node.

At block 1104, the processing logic allocates a second physical extent from the second physical disk to the array to replace the first physical extent in the array. For example, to initiate a migration, the processing logic may assign a new PE to an Array. The new PE may be assigned to a virtual disk and a PE row of the Array. Once the new PEs are assigned, the processing logic may proceed to block 1106.

At block 1106, the processing logic migrates data stored at the first physical extent on the first physical disk to the second physical extent on the second physical disk. To migrate data from the first PE (i.e., a PE that is in use) to the second PE in a new location, the source and destination PEs may be assigned to the same virtual disk index and same PE row. The data on the source PE may then be copied to the destination PE, maintaining a water mark of what stripe units have been migrated. Both the source PE and the destination PE may be kept in sync when new data is written until the migration is complete. Once the migration is complete, the source PE may be made available for re-use. Accordingly, as new nodes are added to the storage cluster, the data layout may be rebalanced to distribute the workload on the disks of the storage system.

FIG. 12A is a detailed flow diagram 1200 of a method of adding disks in a RAID data storage system with a protection pool of storage units, according to some embodiments. For example, method 1200 PEM, LDM, AGRP, Array, or a combination of such, which can be implemented in software, firmware, hardware, or any combination thereof.

Method 1200 begins at step 1202, where a storage management system (SMS) receives a request to add storage to make additional storage available for use in the SMS. At step 1204, the SMS may issue a request to the PEM to make the additional storage (i.e., additional disks) available for use by the SMS. The request may include a list of the disks to make available and a performance group associated with the disks. In response, the PEM may partition the disks into several physical extents (PEs). At step 1206, the PEM may send a request to an SP RAID driver to generate an LDM for the added disks and to add the additional disks to the LDM. The SP RAID driver may initialize a physical extent map and save metadata of the disk. The LDM may then provide a response to the PEM that the LDM has been created (step 1208). The PEM may initialize an internal data object and add the new PEs to a list of free PEs available to be assigned to Arrays. The LDM may provide a response to the SMS that the disks have been added successfully (step 1210).

FIG. 12B is a detailed flow diagram 1250 of a method of adding disks in a RAID data storage system with a protection pool of storage units, according to some embodiments. For example, method 1250 PEM, LDM, AGRP, Array, or a combination of such, which can be implemented in software, firmware, hardware, or any combination thereof.

The method 1250 begins at step 1252, where an SMS receives a user request to make additional storage available for use by the user of the SMS. The request may include a list of the enclosures or disks that are to be added. At step 1254, the SMS generates a list of DM devices and requests the PEM to make the additional disks available for use. The PEM may partition the additional disks in response to receiving the request. At step 1256, the PEM issues a request to the SP RAID driver to add the list of additional disks provided to an existing LDM, or create and additional LDM if needed. The SP RAID driver may provide a response that the addition of the disks was successful (step 1258) and the PEM provides a response to the SMS that the addition of the list was successful (step 1260).

Figure 13:
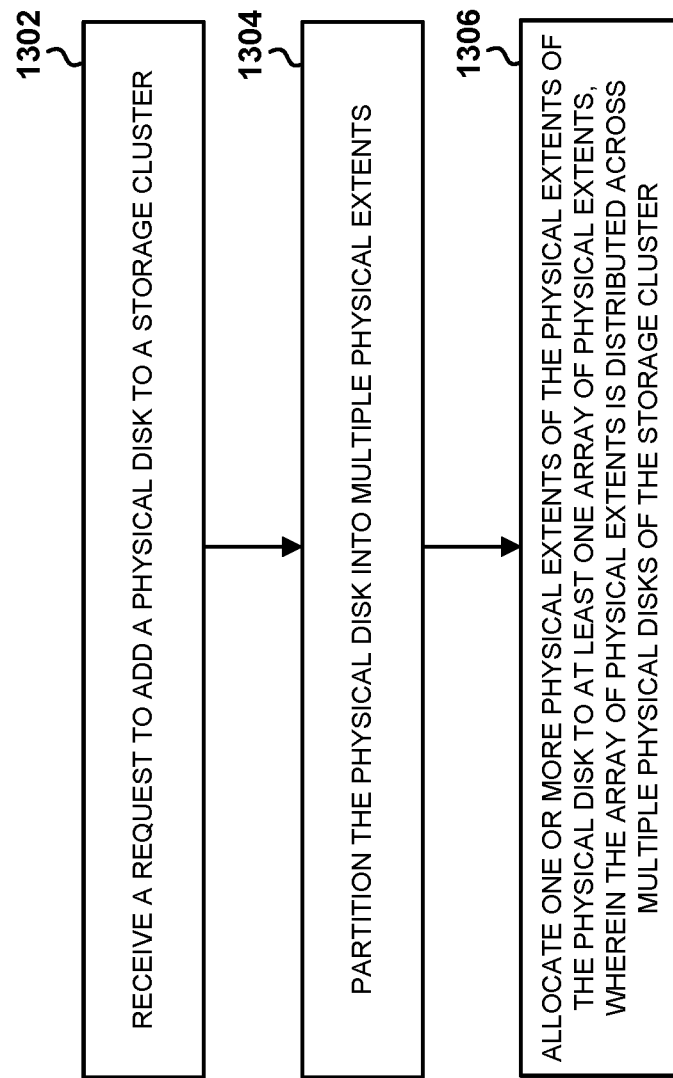
FIG. 13 is a flow diagram of another example method of adding disks in a RAID data storage system with a protection pool of storage units, according to some embodiments

FIG. 13 is a flow diagram illustrating a method 1300 of adding disks in a RAID data storage system with a protection pool of storage units according to one embodiment. For example, method 1100 can be performed by PEM, LDM, AGRP, Array, or a combination of such, which can be implemented in software, firmware, hardware, or any combination thereof.

Referring now to FIG. 13, at block 1302, processing logic receives a request to add a physical disk to a storage cluster. In one example, the processing logic may add the physical disk to a new node on which no storage has yet been configured. In another example, the processing logic may add the physical disk to an existing node in which storage is already configured (e.g., where an LDM exists to manage the disk). At block 1304, the processing logic partitions the physical disk into multiple physical extents. In one example, the processing logic generates a PE map for the physical extents partitioned on the disk. The processing logic may set all the PEs of the newly generated PE map to an available state (i.e., available to be allocated to an Array). The LDM of the newly added disk may be updated according to the partitioned PEs and the PE map. The processing logic may then provide a status of the storage add. The new PEs may then be available to be allocated when a storage add request is received. The processing logic may then register the LDM of the newly added storage with all other nodes in the storage cluster.

At block 1306, the processing logic allocates one or more physical extents of the multiple physical extents of the physical disk to at least one array of physical extents, wherein the array of physical extents is distributed across multiple physical disks of the storage cluster. For example, an Array may add one or more physical extents to the Array (i.e., by adding an additional physical extent or replacing a different PE). The Array may then update an AGRP of the Array and a PEM of the AGRP.

Figure 14:
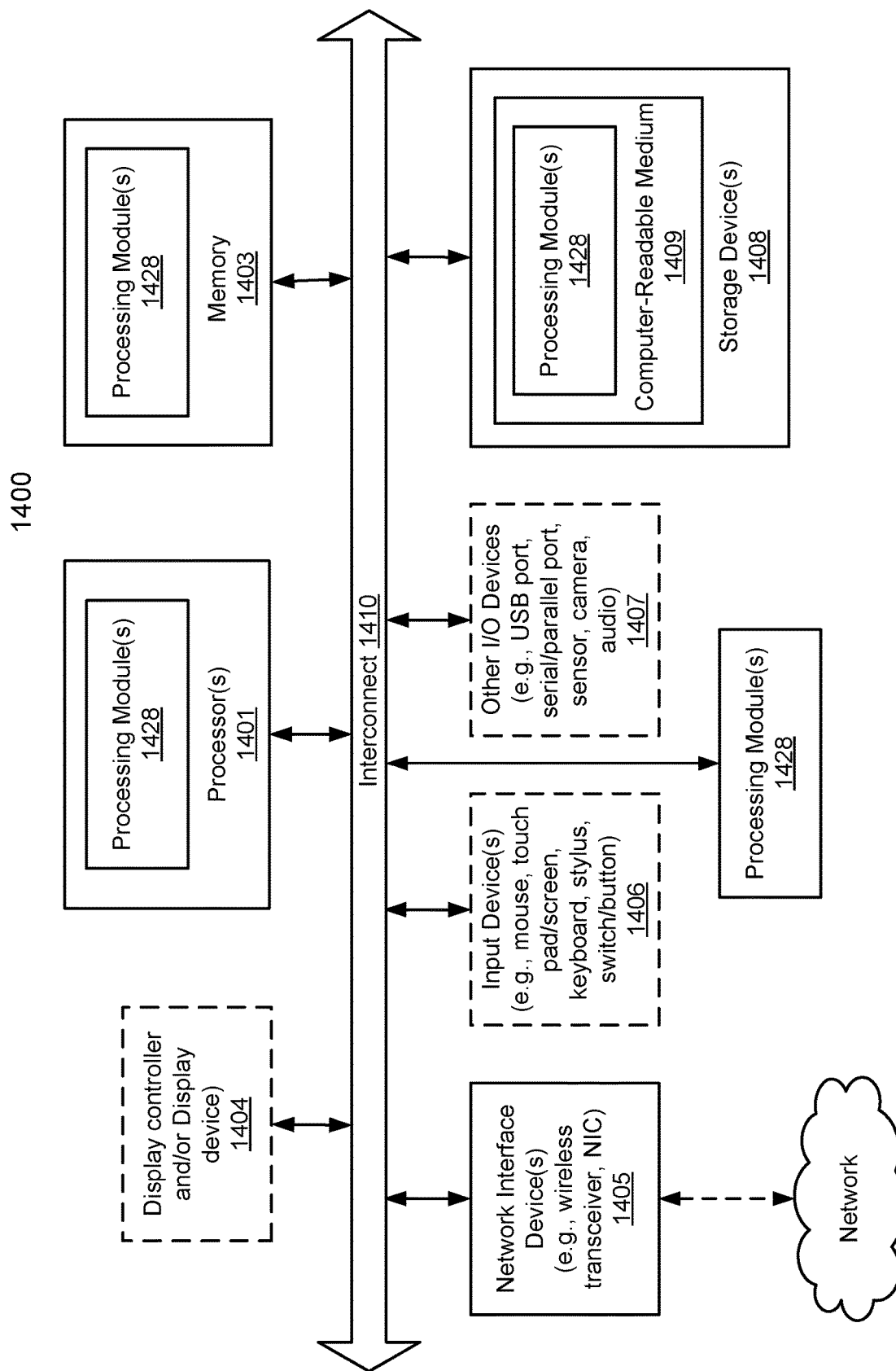
FIG. 14 is a block diagram illustrating a data processing system according to one embodiment.

Various embodiments and FIG. 14 is a block diagram illustrating an example of a data processing system which may be used with one embodiment of the invention. For example, system 1400 may represent any of data processing systems described above performing any of the processes or methods described above. System 1400 can include many different components.

These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1400 is intended to show a high level view of many components of the computer system. However, it is to be understood that additional components may be present in certain implementations and furthermore, different arrangement of the components shown may occur in other implementations. System 1400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1400 includes processor 1401, memory 1403, and devices 1405-1408 via a bus or an interconnect 1410. Processor 1401 may represent a single processor or multiple processors with a single processor core or multiple processor cores included therein. Processor 1401 may represent one or more general-purpose processors such as a microprocessor, a central processing unit (CPU), or the like. More particularly, processor 1401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1401, which may be a low power multi-core processor socket such as an ultra-low voltage processor, may act as a main processing unit and central hub for communication with the various components of the system. Such processor can be implemented as a system on chip (SoC). Processor 1401 is configured to execute instructions for performing the operations and steps discussed herein. System 1400 may further include a graphics interface that communicates with optional graphics subsystem 1404, which may include a display controller, a graphics processor, and/or a display device.

Processor 1401 may communicate with memory 1403, which in one embodiment can be implemented via multiple memory devices to provide a given amount of system memory. Memory 1403 may include one or more volatile storage (or memory) devices such as random access memory (RAM), dynamic RAM (DRAM), synchronous DRAM (SDRAM), static RAM (SRAM), or other types of storage devices. Memory 1403 may store information including sequences of instructions that are executed by processor 1401, or any other device. For example, executable code and/or data of a variety of operating systems, device drivers, firmware (e.g., input output basic system or BIOS), and/or applications can be loaded in memory 1403 and executed by processor 1401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1400 may further include IO devices such as devices 1405-1408, including network interface device(s) 1405, optional input device(s) 1406, and other optional IO device(s) 1407. Network interface device 1405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1406 may include a mouse, a touch pad, a touch sensitive screen (which may be integrated with display device 1404), a pointer device such as a stylus, and/or a keyboard (e.g., physical keyboard or a virtual keyboard displayed as part of a touch sensitive screen). For example, input device 1406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1407 may include an audio device. An audio device may include a speaker and/or a microphone to facilitate voice-enabled functions, such as voice recognition, voice replication, digital recording, and/or telephony functions. Other IO devices 1407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1407 may further include an imaging processing subsystem (e.g., a camera), which may include an optical sensor, such as a charged coupled device (CCD) or a complementary metal-oxide semiconductor (CMOS) and/or an optical sensor, utilized to facilitate camera functions, such as recording photographs and video clips. Certain sensors may be coupled to interconnect 1410 via a sensor hub (not shown), while other devices such as a keyboard or thermal sensor may be controlled by an embedded controller (not shown), dependent upon the specific configuration or design of system 1400.

To provide for persistent storage of information such as data, applications, one or more operating systems and so forth, a mass storage (not shown) may also couple to processor 1401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1401, e.g., via a serial peripheral interface (SPI). This flash device may provide for non-volatile storage of system software, including a basic input/output software (BIOS) as well as other firmware of the system.

Storage device 1408 may include computer-accessible storage medium 1409 (also known as a machine-readable storage medium or a computer-readable medium) on which is stored one or more sets of instructions or software (e.g., processing module, unit, and/or logic 1409) embodying any one or more of the methodologies or functions described herein. Processing module/unit/logic 1409 may represent any of the components described above. Processing module/unit/logic 1409 may also reside, completely or at least partially, within memory 1403 and/or within processor 1401 during execution thereof by data processing system 1400, memory 1403 and processor 1401 also constituting machine-accessible storage media. Processing module/unit/logic 1409 may further be transmitted or received over a network via network interface device 1405.

Computer-readable storage medium 1409 may also be used to store some of the software functionalities described above persistently. While computer-readable storage medium 1409 is shown in an exemplary embodiment to be a single medium, the term "computer-readable storage medium" should be taken to include a single medium or multiple media (e.g., a centralized or distributed database, and/or associated caches and servers) that stores the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1409, components and other features described herein can be implemented as discrete hardware components or integrated in the functionality of hardware components such as ASICS, FPGAs, DSPs or similar devices. In addition, processing module/unit/logic 1409 can be implemented as firmware or functional circuitry within hardware devices. Further, processing module/unit/ logic 1409 can be implemented in any combination hardware devices and software components.

Note that while system 1400 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which may have fewer or more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods described above are in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
receiving a request to add a new physical disk to a storage cluster;
partitioning, by a processing device, the new physical disk into one or more partitions, each partition comprising a plurality of physical extents;
allocating, by the processing device, one or more physical extents of the plurality of physical extents of the new physical disk to at least one array of physical extents, wherein the array of physical extents is distributed across a plurality of physical disks of the storage cluster;
generating a physical extent map for the plurality of physical extents of the new physical disk, wherein each one of the one or more partitions includes metadata storing mapping information from the physical extent map, the mapping information including mapping information between the plurality of physical extents of each partition and corresponding locations on the new physical disk;
adding the plurality of physical extents to a list of free physical extents available to be allocated to an array;
determining whether a local disk manager is available to manage the new physical disk, wherein determining whether the local disk manager is available comprises:
issuing a request to a plurality of local disk managers in the storage cluster for a current state of each of the plurality of local disk managers, and
receiving a reply to the request from one or more of the plurality of local disk managers, wherein the local disk manager being available is based on the reply; and
in response to determining based on the reply, that the local disk manager is available, adding the new physical disk to the local disk manager.

2. The method of claim 1, further comprising:
in response to determining, based on the reply, that the local disk manager is not available:
creating a new local disk manager to manage the new physical disk; and
adding the new physical disk to the new local disk manager.

3. The method of claim 2, further comprising:
registering the new local disk manager with one or more nodes of the storage cluster to make the plurality of physical extents of the new physical disk available to be allocated to arrays of the one or more nodes.

4. The method of claim 1, wherein allocating the one or more physical extents of the plurality of physical extents of the new physical disk to at least one array of physical extents comprises:
determining to migrate one or more source physical extents of another physical disk to the one or more physical extents of the new physical disk, wherein the one or more source physical extents are associated with the at least one array;
replacing the one or more source physical extents in the at least one array with the one or more physical extents of the new physical disk; and
migrating data from the one or more source physical extents to the one or more physical extents of the new physical disk.

5. A system comprising:
a processor; and
a memory to store instructions, which when executed by the processor, cause the processor to perform operations comprising:
receiving a request to add a new physical disk to a storage cluster;
partitioning the new physical disk into one or more partitions, each partition comprising a plurality of physical extents;
allocating one or more physical extents of the plurality of physical extents of the new physical disk to at least one array of physical extents, wherein the array of physical extents is distributed across a plurality of physical disks of the storage cluster;
generating a physical extent map for the plurality of physical extents of the new physical disk, wherein one of the one or more partitions includes metadata storing mapping information from the physical extent map, the mapping information including mapping information between the plurality of physical extents of each partition and corresponding locations on the new physical disk;
adding the plurality of physical extents to a list of free physical extents available to be allocated to an array;
determining whether a local disk manager is available to manage the new physical disk, wherein determining whether the local disk manager is available comprises:
issuing a request to a plurality of local disk managers in the storage cluster for a current state of each of the plurality of local disk managers; and
receiving a reply to the request from one or more of the plurality of local disk managers, wherein the local disk manager being available is based on the reply; and
in response to determining based on the reply, that the local disk manager is available, adding the new physical disk to the local disk manager.

6. The system of claim 5, further comprising:
in response to determining based on the reply, that the local disk manager is not available:
creating a new local disk manager to manage the new physical disk; and
adding the new physical disk to the new local disk manager.

7. The system of claim 6, further comprising:
registering the new local disk manager with one or more nodes of the storage cluster to make the plurality of physical extents of the new physical disk available to be allocated to arrays of the one or more nodes.

8. The system of claim 5, wherein allocating the one or more physical extents of the plurality of physical extents of the new physical disk to at least one array of physical extents comprises:
determining to migrate one or more source physical extents of another physical disk to the one or more physical extents of the new physical disk, wherein the one or more source physical extents are associated with the at least one array;
replacing the one or more source physical extents in the at least one array with the one or more physical extents of the new physical disk; and
migrating data from the one or more source physical extents to the one or more physical extents of the new physical disk.

9. A non-transitory machine-readable medium having instructions stored therein, which when executed by a processor, cause the processor to perform operations comprising:
receiving a request to add a new physical disk to a storage cluster;
partitioning, by the processor, the new physical disk into one or more partitions, each partition comprising a plurality of physical extents;
allocating, by the processor, one or more physical extents of the plurality of physical extents of the new physical disk to at least one array of physical extents, wherein the array of physical extents is distributed across a plurality of physical disks of the storage cluster;
generating a physical extent map for the plurality of physical extents of the new physical disk, wherein one of the one or more partitions includes metadata storing mapping information from the physical extent map, the mapping information including mapping information between the plurality of physical extents of each partition and corresponding locations on the new physical disk;
adding the plurality of physical extents to a list of free physical extents available to be allocated to an array;
determining whether a local disk manager is available to manage the new physical disk, wherein determining whether the local disk manager is available comprises:
issuing a request to a plurality of local disk managers in the storage cluster for a current state of each of the plurality of local disk managers; and
receiving a reply to the request from one or more of the plurality of local disk managers, wherein the local disk manager being available is based on the reply; and
in response to determining based on the reply, that the local disk manager is available, adding the new physical disk to the local disk manager.

10. The non-transitory machine-readable medium of claim 9, further comprising: in response to determining, based on the reply, that the local disk manager 1s not available: creating a new local disk manager to manage the new physical disk; and adding the new physical disk to the new local disk manager.

11. The non-transitory machine-readable medium of claim 10, further comprising:
registering the new local disk manager with one or more nodes of the storage cluster to make the plurality of physical extents of the new physical disk available to be allocated to arrays of the one or more nodes.

* * * * *

UNITED STATES PATENT AND TRADEMARK OFFICE
CERTIFICATE OF CORRECTION

PATENT NO. : 11,748,016 B2
APPLICATION NO. : 17/313999
DATED : September 5, 2023
INVENTOR(S) : Paul Nehse, Michael B. Thiels and Devendra V. Kulkarni Page 1 of 1

It is certified that error appears in the above-identified patent and that said Letters Patent is hereby corrected as shown below:

In the Claims

In Column 20, Claim 1, Line 36, delete "wherein each" and insert --wherein--.

In Column 22, Claim 10, Line 57, delete "manager 1s not" and insert --manager is not--.

Signed and Sealed this
Twenty-ninth Day of April, 2025

Coke Morgan Stewart
*Acting Director of the United States Patent and Trademark Office*